May 8, 1945.  E. O. SCHWEITZER, JR  2,375,591
ELECTRICAL MEASURING APPARATUS
Filed March 23, 1942   3 Sheets-Sheet 1

INVENTOR.
Edmund O. Schweitzer, Jr.
BY
Attys.

May 8, 1945.    E. O. SCHWEITZER, JR    2,375,591
ELECTRICAL MEASURING APPARATUS
Filed March 23, 1942    3 Sheets-Sheet 2
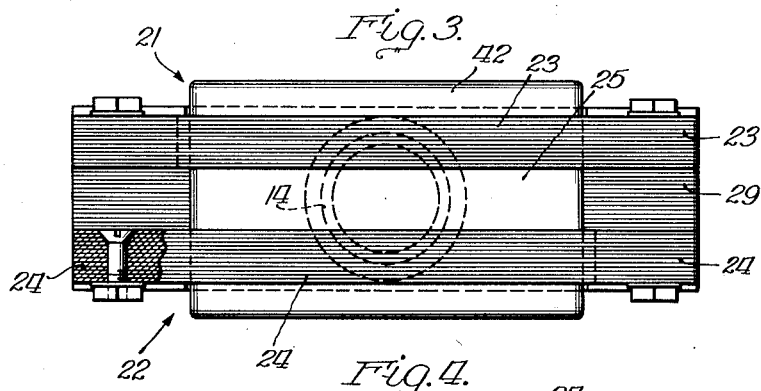
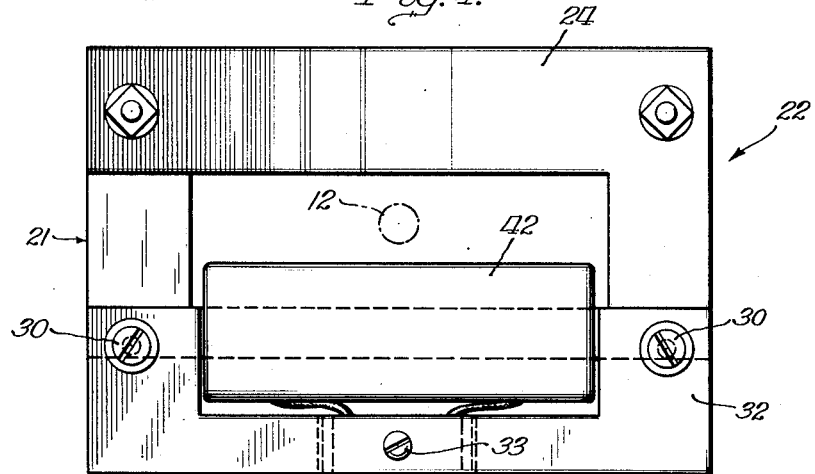
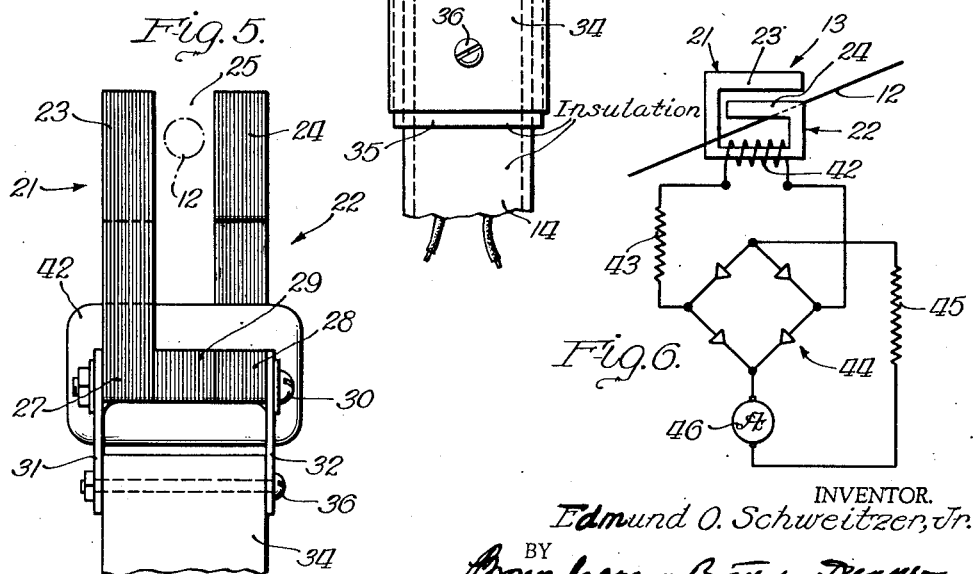
INVENTOR.
Edmund O. Schweitzer, Jr.
BY
Attys.

May 8, 1945.  E. O. SCHWEITZER, JR  2,375,591
ELECTRICAL MEASURING APPARATUS
Filed March 23, 1942   3 Sheets-Sheet 3
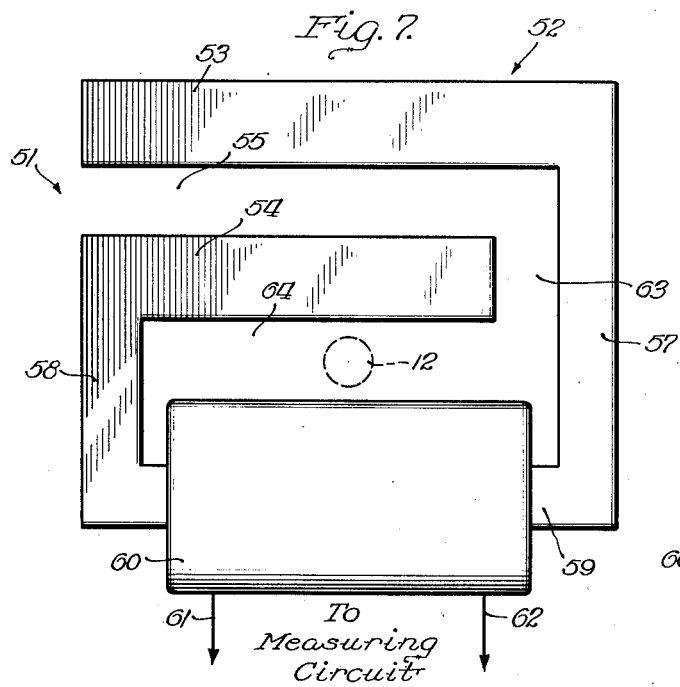
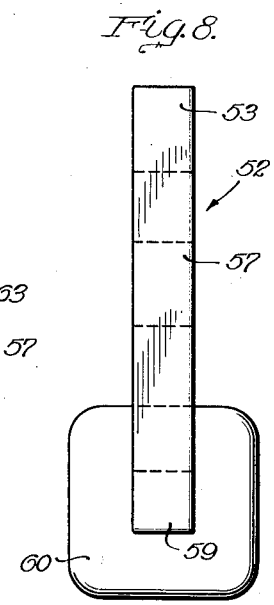
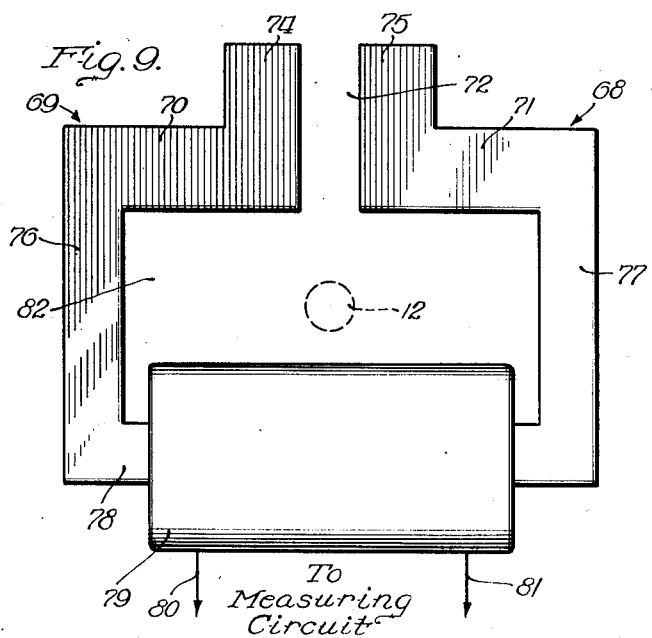
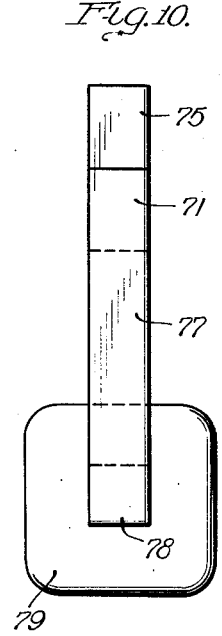
INVENTOR.
Edmund O. Schweitzer, Jr.
BY
Attys.

Patented May 8, 1945

2,375,591

UNITED STATES PATENT OFFICE 2,375,591

ELECTRICAL MEASURING APPARATUS

Edmund O. Schweitzer, Jr., Northbrook, Ill.

Application March 23, 1942, Serial No. 435,825

9 Claims. (Cl. 175—358)

My invention relates, generally, to electrical measuring apparatus and it has particular relation to the construction of current transformers for measuring the flow of alternating current.

It is well known in the electrical art that the flow of alternating current in a conductor can be measured by means of what is commonly known as a split ring current transformer. Various forms of split ring current transformers are on the market. In so far as I am aware all of the split ring transformers now available require that the magnetic circuit or iron core be opened so as to place it in proper inductive relation to the conductor whose current is to be measured. Subsequently the magnetic circuit is closed. Generally such a construction involves one or more hinged joints to permit opening and closing of the magnetic circuit or core structure.

Obviously, such a procedure is hazardous to the operator or meter man who must handle the split ring current transformer, particularly where there are adjacent live or energized conductors with which a portion of his body may come into contact. It is usually the case that it is desirable to apply the split ring current transformer to a conductor in which the current is flowing and while the conductor is energized at a relatively high voltage. In some instances even relatively low voltages such as 110, 220 or 440 volts on such conductors have resulted in severe injuries, sometimes fatal, to operators and meter men using split ring current transformers. In view of the foregoing it is obviously desirable to maintain a considerable distance between the body of the operator or meter man and the conductor whose current is to be measured. In so far as I am aware there is no device in the prior art which is entirely satisfactory for this purpose.

An object of my invention is to provide a current transformer which can be placed in operative position relative to a conductor in such manner that there is little or no likelihood of the operator or meter man coming in contact with an energized conductor.

Another object of my invention is to so arrange and construct the magnetic core structure of a current transformer that it can be applied to a conductor without requiring any relative movement of any of the parts making up the core structure.

It is a further object of my invention to provide a current transformer construction for measuring the current flow through a conductor which requires no rearrangement of the conductor or parts making up the current transformer, particularly its core structure.

It is a further object of my invention to accomplish the foregoing objects in a current transformer without introducing any objectionable electrical operating characteristics in the device. Stated differently, it is an object of my invention to so construct the magnetic circuit of the current transformer according to my invention that satisfactory operating characteristics are obtained throughout a wide range of current values which the device may be required to measure.

Another object of my invention is to so arrange and construct a current transformer and its measuring means that a substantially linear relation exists between the current being measured and the deflection of the measuring instrument.

Other objects of my invention will, in part, be obvious and in part appear hereinafter.

For a more complete understanding of the nature and scope of my invention reference can be had to the following detailed description taken in connection with the accompanying drawings in which;

Figure 3 is a top plan view, a certain portion being shown in section, of the current transformer shown in Figures 1 and 2;

Figure 4 is a view, in side elevation, of the current transformer shown in Figure 3;

Figure 5 is a view, in end elevation, of the current transformer shown in Figures 3 and 4;

Figure 6 illustrates diagrammatically the electrical circuit connections which can be used in practicing the present invention;

Figure 7 is a view, in side elevation, of another embodiment of my invention;

Figure 8 is a view, in end elevation, of the construction shown in Figure 7;

Figure 9 is a view, in side elevation, of still another embodiment of my invention; and Figure 10 is a view, in end elevation, of the construction shown in Figure 9.

Figures 1, 2:
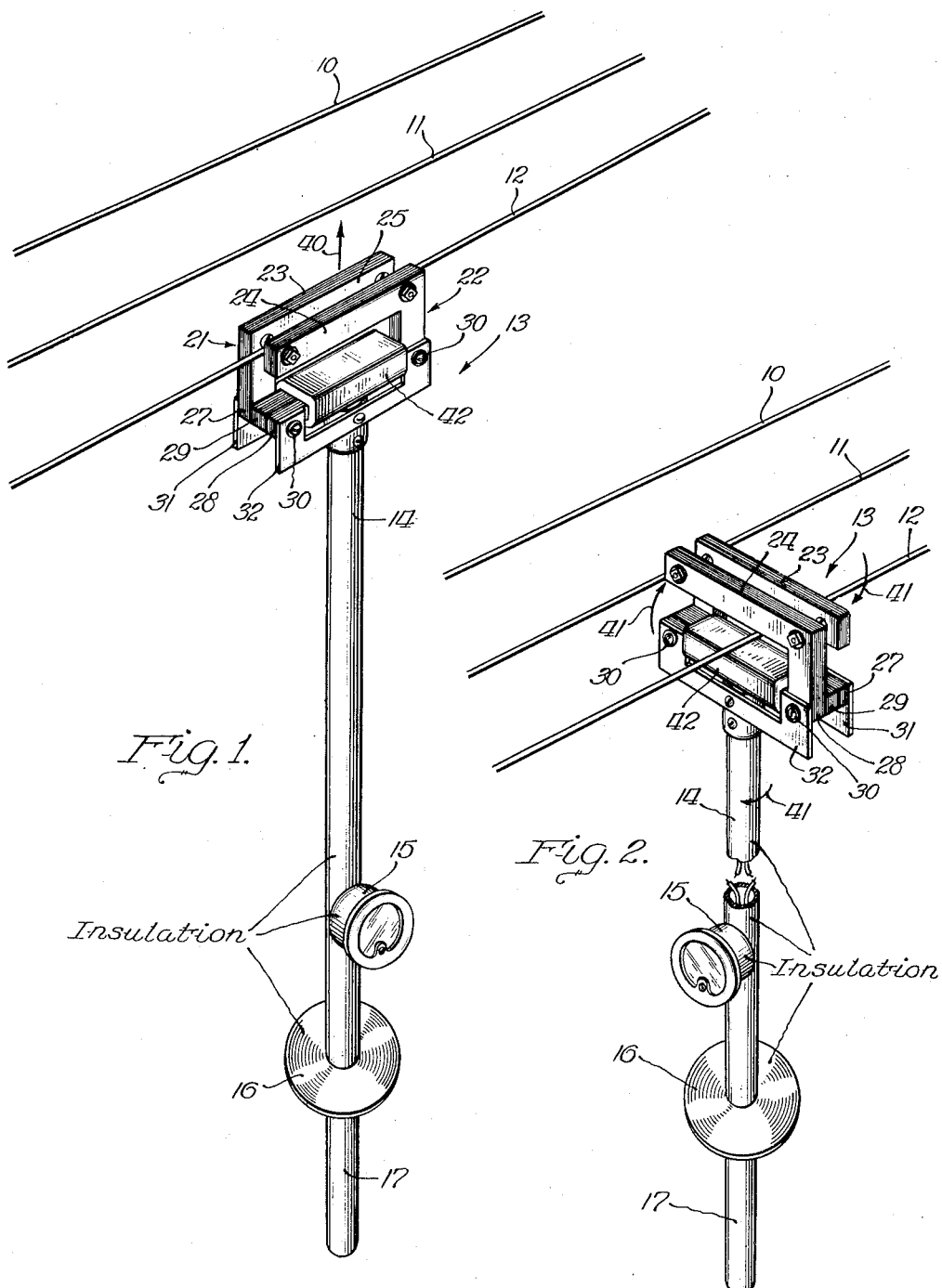
Figure 1 is a perspective view showing a current transformer constructed in accordance with my invention and the first step of its application to an electrical conductor carrying alternating current for measuring the current flow therethrough.
Figure 2 is a view, similar to Figure 1, showing the current transformer in the operative position for measuring the current flow through an electrical conductor.

Referring now particularly to Figure 1 of the drawings, it will be observed that three electrical conductors 10, 11 and 12 are illustrated. These conductors may be the conductors for a three phase alternating current system or a single phase three wire alternating current system. It will be understood that the present invention is not limited for use with any particular number of conductors, it being understood that it is intended for use in measuring the flow of alternating current through any single conductor of a system regardless of the number of conductors in the system. The conductors 10, 11 and 12 may be insulated or bare conductors. They may be energized with any commercial voltage such as 110, 220, 440, 1100, 2300 volts and upwards.

It is often the case that it is desirable to measure the current flow through a conductor when installed in service and which it is undesirable or difficult to disconnect and insert in it a conventional form of current transformer. For example, it may be desirable to measure the flow of current from a power or distribution transformer to a load such as a factory or substation or the like. It may happen that the load is of widely varying character and it is desirable to make a study of it in order to alter the supply system or to change the basis on which the customer is billed for the electric service. In such case it is desirable to have a current transformer which can be placed in operative inductive relation to the conductor without in any way disturbing the conductor and at the same time without endangering the life of the operator or meter man who is making the test or measurement.

With the foregoing in mind I have provided a current transformer, designated generally by the reference character 13. The current transformer 13 is mounted on a handle 14 of insulating material, such as varnished fiber or a phenolic condensation product and, as shown in Figure 2, it is preferably hollow to lighten the weight and provide a conduit for the conductors. A motor or instrument housing 15 of insulating material is mounted on the handle 14 near the lower end and is so placed that the meter contained therein can be easily viewed by the operator. A shield 16 of insulation is secured, as indicated, to the handle 14 above the lower end portion 17 which is arranged to be grasped by the hand of the operator.

Again referring to the transformer 13 it will be observed that its laminated magnetic core structure is formed by a pair of oppositely disposed C-shaped core sections shown generally at 21 and 22. These core sections 21 and 22 include, respectively, spaced apart arms 23 and 24. The space 25 between the arms 23 and 24 is such that the arms 23 and 24 can be moved readily relative to the conductor 12, for example. In other words, the arms 23 and 24 are spaced sufficiently far apart so as to receive therebetween any conductor, either bare or insulated, likely to be encountered in the use of the device, the space 25 constituting a permanently open entrance slot through which the conductor passes into the core structure.

The core sections 21 and 22 also include arms 27 and 28 which form the lower portions of the C-shaped sections. As shown more clearly in Figure 5 of the drawings, the lower arms 27 and 28 of the C-shaped core sections 21 and 22 are spaced apart by a core section 29 which, it will be observed, maintains the spacing 25 between the arms 23 and 24. Screws 30, extending through end plates 31 and 32, the arms 27 and 28 and the core section 29, serve to hold the core structure in a unitary rigid relationship with the space 25 being permanently maintained. The end plates 31 and 32 are secured by a screw 33 to the upper end of a metallic sleeve 34 which is slipped over a spacer 35 of insulation that is carried by the upper end of the handle 14. This construction is shown in more detail in Figure 4 of the drawings. A screw 36 serves to hold the metallic sleeve 34 in place on the upper end of the handle 14.

As shown in Figure 1 of the drawings, the transformer 13, mounted on the upper end of the handle 14 is first moved upwardly in the direction indicated by the arrow 40 with the magnetic core structure formed by the sections 21, 22 and 29 substantially in the plane of the conductor 12, the permanently open entrance slot 25 receiving the conductor 12 directly. After the assembly has been moved upwardly sufficiently far for the conductor 12 to clear the undersides of the arms 23 and 24, the handle 14 is turned in a clockwise direction, as indicated by the arrows 41 in Figure 2 of the drawings, so as to place the core structure in a plane substantially at right angles to the axis of the conductor 12 and in a position where a maximum number of flux lines generated by current flow through the conductor 12 are permitted to flow through the core structure. That is, after the transformer 13 has been moved upwardly sufficiently far for the arms 23 and 24 to clear the conductor 12, then the transformer is turned to such a position that the core completely surrounds the conductor. In the position shown in Figure 2 of the drawings the magnetic flux in the core structure generated by the flow of alternating current through the conductor 12 will bear a predetermined relationship to the amount of current flow. Therefore, it is only necessary to obtain a measure of this magnetic flux in order to have an indication of the amount of current flow in the conductor 12. For this purpose a winding 42 is placed on the section of the magnetic core formed by the arms 27 and 28 and the section 29. Any suitable means, such as an ammeter, can be connected across the terminals of the winding 42 for measuring the current flow therethrough.

Referring particularly to Figure 6 of the drawings, it will be observed that the winding 42, which in effect constitutes a secondary winding, the primary winding being formed by the conductor 12, is connected through a resistor 43 across a bridge circuit, designated generally at 44, of the dry or copper oxide rectifier type. The bridge circuit 44 is connected through a resistor 45 to an ammeter 46 which may be of the D'Arsonval type. By employing the bridge circuit 44 it is possible to remove the ammeter 46 from the circuit without open circuiting the circuit including the secondary winding 42 of the transformer 13. This may be desirable under certain conditions where it is desirable to have the transformer 13 remain in place and it is necessary to change the ammeter 46 without short circuiting the secondary winding 42 to avoid the generation of a dangerous voltage.

When a rectifier, such as the rectifier 44 shown in Figure 6, is employed, I have found that a substantially linear relation exists between the flow of current in the conductor, such as the conductor 12, and the deflection of the pointer over the scale of the ammeter 46. Because of this it is possible to employ the same apparatus to measure accurately a wider range of current values than is the case when, for example, a conventional measuring circuit is used with an ammeter having a scale calibrated in an exponential manner.

It will be understood that, while the transformer 13 has been illustrated as being mounted on a handle 14, it can be employed without such a mounting if so desired. For example, it may be desirable to employ a number of transformers, similar to transformer 13, for temporary use in measuring the current flow though a polyphase bus where the permanently installed current transformers have been injured or destroyed or have lost their calibration because of the effect of direct current components caused by fault conditions. Such a temporary installation may also be desired where the accuracy of the permanently installed current transformers is to be checked in connection with metering or relay operations.

Now it will be observed that the amount of core material in the arms 23 and 24 is substantially greater than the amount of core material making up the lower arms 27 and 28 of the core sections 21 and 22, respectively. Such a construction is employed in order to provide a magnetic circuit around the secondary winding 42 having a substantially uniform reluctance. Because of the air gap provided by the space 25 between the arms 23 and 24, the reluctance of this portion of the magnetic circuit is considerably higher than that of the portion of the magnetic circuit occupied by the section 29. However, by providing additional material in the arms 23 and 24, the effect of the air gap provided by the space 25 is minimized and a magnetic circuit having substantially uniform reluctance is provided. As a result, the current transformer 13 inherently possesses a high degree of accuracy and is fully comparable to current transformers having completely closed magnetic circuits in so far as the operating characteristics are concerned.

In Figures 7 and 8 of the drawings I have shown another form of transformer construction, designated generally at 51, which can be employed instead of the construction shown in Figures 1 through 5 of the drawings and described hereinbefore. The transformer construction shown at 51 comprises a core structure, shown generally at 52, which comprises oppositely extending parallel end sections 53 and 54 which are spaced apart as indicated at 55 for receiving a conductor, such as the conductor 12, therebetween. The connecting sections 57 and 58 and intermediate section 59 serve to interconnect the end sections 53 and 54, as shown.

A measuring winding 60 can be located on the intermediate section 59 and it can be connected by conductors 61 and 62 to a suitable measuring circuit, such as the circuit shown in Figure 6 of the drawings.

In placing the transformer construction 51 in place with respect to the conductor, such as the conductor 12, the core structure 52 is moved relative to the conductor so that the latter passes through the space or air gap 55 between the end sections 53 and 54. It then passes through the space 63 between the end of the end section 54 and the adjacent side of the connecting section 57. Finally, the conductor is located in the window or space 64 where it is completely surrounded by the magnetic core structure.

Because of the fact that the end sections 53 and 54 overlap for the major portions of their respective lengths, the effect of the air gap provided by the space 55 in the magnetic core structure is substantially reduced or neutralized so that a magnetic circuit having substantially uniform reluctance throughout is provided around the conductor when it is placed in the window 64. As a result the current flowing through the conductor, such as the conductor 12, can be accurately measured over a wide range of currents and power factors.

As shown in Figure 8 of the drawings, the end sections 53 and 54, the connecting sections 57 and 58, and the intermediate section 59 all occupy substantially coplanar relation.

In Figures 9 and 10 there is shown still another embodiment of the invention. The transformer is designated generally by the reference character 68 and it comprises a magnetic core structure indicated generally at 69. The magnetic core structure 69 comprises end sections 70 and 71 which extend in opposite directions and are spaced endwise from each other as indicated at 72. The space 72 is such as to readily admit a conductor, such as the conductor 12, the current flow through which is to be measured. With a view to minimizing the effect of the air gap provided by the space 72 extensions 74 and 75 are provided from the end sections 70 and 71, as shown, so as to provide a relatively large amount of magnetic material adjacent the air gap. As will be readily understood, this construction will substantially reduce the effect of the air gap in the magnetic core structure 69 and will substantially neutralize its effect therein.

The end sections 70 and 71 are connected by connecting sections 76 and 77 to an intermediate section 78 of the core structure 69. A measuring winding 79 is located on the intermediate section 78 and it can be connected by suitable conductors 80 and 81 to a measuring circuit, such as the measuring circuit shown in Figure 6 of the drawings and described hereinbefore.

On referring to Figure 10 of the drawings it will be observed that the end sections 70 and 71, the connecting sections 76 and 77 and the intermediate section 78 of the core structure 69 are all located in a substantially coplanar relation. It will also be noted that the extensions 74 and 75 are coplanar with respect to the remaining portions of the core structure 69. However, it will be understood that these extensions 74 and 75 can extend at right angles to the end sections 70 and 71 in either or both directions without departing from the scope of this invention.

Since it is obvious that certain further changes can be made in the foregoing constructions without departing from the spirit and scope thereof, it is intended that all matter shown in the accompanying drawings and described hereinbefore shall be interpreted as illustrative and not in a limiting sense.

I claim as my invention:

1. A transformer for use in measuring alternating current flow in a conductor comprising, in combination, a pair of oppositely opening C-shaped magnetic members having their arms in spaced side-by-side relation, a magnetic spacer member between one pair of said arms to form a continuous magnetic circuit, the space between the spaced apart pair of arms being such as to readily receive said conductor therebetween to permit locating the same so as to be completely surrounded by the magnetic circuit formed by said magnetic members, and a measuring winding linking said continuous magnetic circuit for measuring the current flow in said conductor.

2. A transformer for use in measuring alternating current flow in a conductor comprising, in combination, a pair of oppositely opening C-shaped magnetic core members having their arms in spaced side-by-side relation, a magnetic spacer member between a first pair of said arms to form a continuous magnetic circuit, the space between the other pair of arms which are spaced apart being such as to readily receive said conductor therebetween to permit locating the same so as to be completely surrounded by the magnetic circuit formed by said magnetic members, the core material making up said spaced apart pair of arms being substantially in excess of that making up said first pair of arms whereby said magnetic circuit has substantially uniform reluctance around said circuit, and a measuring winding linking said continuous magnetic circuit for measuring the current flow in said conductor.

3. A transformer for use in measuring alternating current flow in a conductor comprising, in combination, a magnetic core structure substantially rigid throughout and having no relatively movable parts providing a window for receiving said conductor and having a fixed air gap therein whereby said core structure and said conductor can be relatively moved to position the latter in said window with said core structure completely surrounding said conductor, the amount of material making up said core structure adjacent said air gap being such that the effect of said air gap in said magnetic core structure is substantially neutralized, and a measuring winding linking said core structure for measuring the current flow in said conductor.

4. A transformer for use in measuring alternating current flow in a conductor comprising, in combination, a magnetic core formed by a pair of oppositely disposed C-shaped core sections having rigidly fixed spaced apart arms which face in opposite directions and extend in substantially parallel relation to define a permanently open entrance slot therebetween, the two opposite arms of said C-shaped core sections being connected together, and a winding linking said two opposite arms.

5. A transformer for use in measuring alternating current flow in a conductor comprising, in combination, a magnetic core formed by a pair of oppositely disposed C-shaped core sections having rigidly fixed spaced apart arms which face in opposite directions and extend in substantially parallel relation to define a permanently open entrance slot therebetween, the two opposite arms of said C-shaped core sections being connected together, and a winding linking said two opposite arms, the core material making up said two spaced apart arms being substantially in excess of that making up said two opposite arms to provide a magnetic circuit of substantially uniform reluctance around said circuit, said winding being adapted to be connected to measuring means for measuring the current flow therethrough as a function of the current flow through said conductor.

6. A transformer for use in measuring alternating current flow in a conductor comprising, in combination, a generally rectangular core structure providing a window for receiving said conductor and having a pair of rigidly fixed oppositely extending spaced apart arms defining a permanently open entrance slot therebetween through which said conductor is adapted to enter said window, and a measuring winding linking said core structure for measuring the current flow in said conductor.

7. In a transformer for measuring alternating current flow in a conductor, the combination of a core structure comprising a main horizontal portion, a vertical leg extending rigidly from each end of said horizontal portion, a horizontal arm extending rigidly inwardly from each vertical leg, said two horizontal arms extending toward each other in offset planes so as to lie in parallel, side-by-side overlapping relation to define a permanently open entrance slot therebetween, and a winding surrounding said main horizontal portion of the core structure, said winding being adapted to be connected to measuring means for measuring the current flow therethrough as a function of the current flow through said conductor.

8. In a portable electrical measuring device of the type in which the current responsive means is mounted on the upper end of a long rod-like insulating handle adapted to be grasped at the other end by the operator for maneuvering the current responsive means into predetermined relation to an alternating current line wire, the combination therewith of a core structure for said current responsive means comprising a main horizontal portion, a vertical leg extending rigidly upwardly from each end of said horizontal portion, a horizontal arm extending rigidly inwardly from each vertical leg, said two horizontal arms extending toward each other in offset planes so as to lie in parallel, overlapping relation to define a permanently open entrance slot therebetween, and a winding surrounding said main horizontal portion of the core structure, said winding being adapted to be connected to measuring means for measuring the current flow therethrough as a function of the current flow through said alternating current line wire.

9. In a transformer for measuring alternating current flow in a conductor, the combination of a core structure comprising a main body portion, legs rigidly extending from the ends of said main body portion, arms rigidly extending toward each other from said legs so as to lie in parallel overlapping relation to define a permanently open entrance slot therebetween, said main body portion together with said legs and said arms lying in substantially coplanar relation and being adapted to completely surround said conductor, and a measuring winding linking said main body portion for measuring the current flow in said conductor.

EDMUND O. SCHWEITZER, Jr.